United States Patent
Nishizaki et al.

(10) Patent No.: US 7,809,573 B2
(45) Date of Patent: Oct. 5, 2010

(54) VOICE OUTPUT APPARATUS AND VOICE OUTPUT METHOD

(75) Inventors: Makoto Nishizaki, Nerima-ku (JP); Tomohiro Konuma, Kawaguchi (JP); Mitsuru Endo, Setagaya-ku (JP)

(73) Assignee: Panasonic Corporation, Osaka (JP)

( * ) Notice: Subject to any disclaimer, the term of this patent is extended or adjusted under 35 U.S.C. 154(b) by 982 days.

(21) Appl. No.: 10/542,947

(22) PCT Filed: Apr. 27, 2004

(86) PCT No.: PCT/JP2004/006065
§ 371 (c)(1), (2), (4) Date: Jul. 21, 2005

(87) PCT Pub. No.: WO2004/104986
PCT Pub. Date: Dec. 2, 2004

(65) Prior Publication Data
US 2006/0085195 A1  Apr. 20, 2006

(30) Foreign Application Priority Data
May 21, 2003  (JP) .............................. 2003-143043

(51) Int. Cl.
*G10L 21/00* (2006.01)
*G10L 13/08* (2006.01)
(52) U.S. Cl. ....................................... 704/270; 704/260
(58) Field of Classification Search ................. 704/270, 704/275
See application file for complete search history.

(56) References Cited

U.S. PATENT DOCUMENTS

| | | | | |
|---|---|---|---|---|
| 4,884,972 A | * | 12/1989 | Gasper | 434/185 |
| 5,303,327 A | * | 4/1994 | Sturner et al. | 704/270 |
| 5,758,318 A | * | 5/1998 | Kojima et al. | 704/251 |
| 5,850,211 A | * | 12/1998 | Tognazzini | 345/158 |
| 7,151,435 B2 | * | 12/2006 | Brackett et al. | 340/5.74 |
| 7,174,295 B1 | * | 2/2007 | Kivimaki | 704/260 |
| 2004/0032935 A1 | * | 2/2004 | Mills et al. | 379/88.22 |
| 2004/0190687 A1 | * | 9/2004 | Baker | 379/88.01 |

FOREIGN PATENT DOCUMENTS

| | | |
|---|---|---|
| JP | 5-216618 | 8/1993 |
| JP | 6-321030 | 11/1994 |

(Continued)

OTHER PUBLICATIONS

Hiroshi Tamura, entitled "*Human Interface*", 1998, pp. 32-33, 69-79, 212-213, 383-387 and 398-411.

*Primary Examiner*—Richemond Dorvil
*Assistant Examiner*—Douglas C Godbold
(74) *Attorney, Agent, or Firm*—Wenderoth, Lind & Ponack, L.L.P.

(57) ABSTRACT

A voice output apparatus, enhancing a robustness of an interface between a user and the apparatus by transmitting, information to the user via text message and voice message. The voice output apparatus including a display unit (107) displaying a text message that is apparatus-transmitting information to be transmitted to the user, a delay unit (105), and a voice output unit (106) estimating a delay time necessary for an action taken by the user to visually identify the text message displayed by the display unit (107), and outputting, via voice message, the apparatus-transmitting information, when the delay time (T) passes after the text message is displayed.

16 Claims, 13 Drawing Sheets

FOREIGN PATENT DOCUMENTS

| | | |
|---|---|---|
| JP | 8-54894 | 2/1996 |
| JP | 10-340095 | 12/1998 |
| JP | 11-145955 | 5/1999 |
| JP | 11-339058 | 12/1999 |
| JP | 2001-142484 | 5/2001 |
| JP | 2003-99092 | 4/2003 |
| JP | 2003-108171 | 4/2003 |
| JP | 2003-241779 | 8/2003 |

* cited by examiner (a)

(b)

Reference distance (LA) 0cm
Intermediate distance 5cm
Maximum distance (LC) 10cm

VOICE OUTPUT APPARATUS AND VOICE OUTPUT METHOD

TECHNICAL FIELD

The present invention relates to a voice output apparatus that transmits information to the user via voice message, and in particular, to a voice output apparatus that outputs a voice message and also displays a text message representing the same information as transmitted via voice message.

BACKGROUND ART

The voice output apparatus that transmits information to the user via voice message has been conventionally provided, and is employed as a terminal in a car navigation system or as an interface for a TV or a personal computer.

Some of the voice output apparatuses not only output a voice message but also display the information via text message in order to surely transmit the information to the user (see reference to the following Japanese Laid-Open Applications: No. 11-145955, No. 11-339058, No. 2001-142484 and No. 5-216618). Even in the case where the user misses a voice message, the user can get the information transmitted from the voice output apparatus, by reading the displayed text message without being bothered to operate the voice output apparatus.

FIG. 1 is a diagram showing the structure of the conventional voice output apparatus for transmitting information via voice message and text message.

The voice output apparatus 900 obtains necessary information from the user in interactive mode so as to sell railway tickets to the user. Such voice output apparatus 900 is comprised of a microphone 901, a voice processing unit 902, a transmitting information generating unit 903, a voice output unit 904 and a display unit 905.

The microphone 901 obtains a verbal input from the user.

The voice processing unit 902 specifies user-transmitting information that the user tries to transmit to the voice output apparatus 900 based on the verbal input obtained by the microphone 901, and outputs the user-transmitting information to the transmitting information generating unit 903. For example, when the user utters "o-o-sa-ka" toward the microphone 901, the voice processing unit 902 specifies a name of the station "Osaka Station" as the user-transmitting information.

The transmitting information generating unit 903 generates apparatus-transmitting information to be transmitted to the user, based on the user-transmitting information specified by the voice processing unit 902, and outputs the apparatus-transmitting information to the voice output unit 904 as well as the display unit 905. For example, in the case where the user-transmitting information indicates a departure station "Osaka Station", the transmitting information generating unit 903 generates apparatus-transmitting information for inquiring an arrival station, and outputs the generated apparatus-transmitting information.

Having obtained the apparatus-transmitting information from the transmitting information generating unit 903, the voice output unit 904 outputs the apparatus-transmitting information via voice message. For example, the voice output unit 904, having obtained the apparatus-transmitting information for inquiring an arrival station, outputs a voice message that goes "To where?".

The display unit 905, having obtained the apparatus-transmitting information from the transmitting information generating unit 903, displays the apparatus-transmitting information via text message. For example, having obtained the apparatus-transmitting information inquiring an arrival station, the display unit 905 displays a text message that says "To where?".

FIG. 2 is a diagram showing an example of the screen displayed by the display unit 905 in the voice output apparatus 900.

The display unit 905 displays a condition section 905$a$, a specification section 905$b$ and a question section 905$c$. The condition section 905$a$ displays the information for inquiring the user of a departure station, an arrival station, and others, and the specification section 905$b$ displays the name of stations which is transmitted by the user, or the like, while the question section 905$c$ displays the apparatus-transmitting information presented via text message, as explained above.

The user purchases a ticket by operating such a voice output apparatus 900 in interactive mode.

Here, the conventional voice output apparatus 900 outputs a voice message as well as displays a text message (see reference to Laid-Open Japanese Application No. 5-216618). For example, the voice output unit 904 outputs a voice message that goes "To where?" while the display unit 905 displays a text message "To where?".

The conventional voice output apparatus 900, however, outputs a voice message as well as displays a text message at the same time. The user's attention concentrates on the voice message rather than the text message, and therefore, the display of the text message means nothing to the user. It is problematic that robustness of the interface between the user and the apparatus cannot be improved.

This is because it requires a lot of time for a human being to understand the text message that is displayed. It is a known fact that it requires 70 to 700 ms for a human being to start moving one's eyeballs after the display of the text message (see reference to "Human Interface" written by Hiroshi Tamura, Ohm-shya, 1998). The average time is 200 ms. More time is further required to move a focal point to the position of the text message and then focus on it.

The present invention is conceived in view of the above problem, and an object of the present invention is to provide the voice output apparatus that improves the robustness of the interface between the user and the apparatus by surely transmitting, to the user, the information via text message and voice message.

DISCLOSURE OF INVENTION

In order to achieve the above object, the voice output apparatus according to the present invention is a voice output apparatus including: a text display unit that displays a text message which is information to be transmitted to a user; and a voice output unit that outputs, via voice message, the information to be transmitted, when a delay time passes, the delay time being a time necessary for an action taken by the user to visually identify a text message after the text message is displayed by the text display unit.

Thus, after the delay time has passed, the voice presenting the information to be transmitted is outputted after the display of the text message representing the information, therefore, the user can simultaneously start recognizing the text message and the voice message, in a state where the user focuses on the displayed text message by moving the eyeballs so as to pay his/her attention to both the voice message and the text message. As a result, the robustness of the interface between the user and the apparatus can be enhanced by surely transmitting to the user the information via text message and voice message.

The voice output apparatus may include a delay estimating unit that estimates the delay time according to a display mode of the text message displayed by the text display unit, wherein the voice output unit may output the information to be transmitted via voice message, when the delay time estimated by the delay estimating unit passes after the text message is displayed by the text display unit.

Thus, the user can start recognizing the text message and the voice message at the same time since the delay time is estimated according to the display mode of the text message even when the display mode displayed by the text display unit varies.

The voice output apparatus may further include a personal information obtaining unit that obtains personal information indicating a characteristic of the user, wherein the delay estimating unit may estimate the delay time for each user based on personal information obtained by the personal information obtaining unit. For example, the personal information obtaining unit obtains the user's age as the personal information while the delay estimating unit estimates the delay time according to the user, based on the age obtained by the personal information obtaining unit.

Thus, the delay time is estimated based on the age indicating a user's characteristic. It is, therefore, possible to delay, for each user, the output of the voice message after the display of the text message by the delay time according to the user's age, and surely transmit the information via text message and voice message. For example, the habituation specifying unit specifies, as the degree of habituation, the number of times the user operates the operation unit.

The delay estimating unit may further include an operating unit that allows the text display unit to display the text message, and allows the voice output unit to output a voice message, according to user's operation; and a habituation specifying unit that specifies a degree of habituation at which the user operates the operating unit, wherein the delay time estimation unit may estimate the delay time in accordance with the user's habituation, based on the degree of habituation specified by the habituation specifying unit. For example, the habituation specifying unit specifies the number of times the user operates the operating unit as the degree of habituation.

Thus, the delay time is estimated based on a degree of user's habituation. It is therefore possible to delay, by the delay time according to the degree of habituation, the output of the voice message after the display of the text message, and surely transmit the information via text message and voice message, to the user.

The delay estimating unit may also specify the focusing time based on a text display distance between a focal point and the text message displayed by the text display unit, the focal point being set on the voice output apparatus for attracting user's attention.

The focusing time usually gets shorter as the text display distance becomes shorter, so that it is possible to identify an appropriate focusing time by thus identifying the focusing time based on the text display distance.

The delay estimating unit may also estimate the delay time by use of sigmoid function.

Since the sigmoid function can express a model of an ecosystem, it is possible to estimate an appropriate delay time corresponding to biological characteristics, by estimating the delay time thus using the sigmoid function.

The delay estimating unit may specify the starting time based on the size of characters in the text displayed by the text display unit.

Since the starting time gets longer as the size of characters in the text message becomes smaller, it is possible to specify an appropriate starting time by specifying the starting time based on the size of characters.

Note that the present invention can be realized as a voice output method or a program thereof by which a voice message is outputted by the voice output apparatus as described above.

DETAILED DESCRIPTION OF THE INVENTION

The following describes the voice output apparatus according to the embodiment of the present invention with reference to the diagrams.

Figure 1:
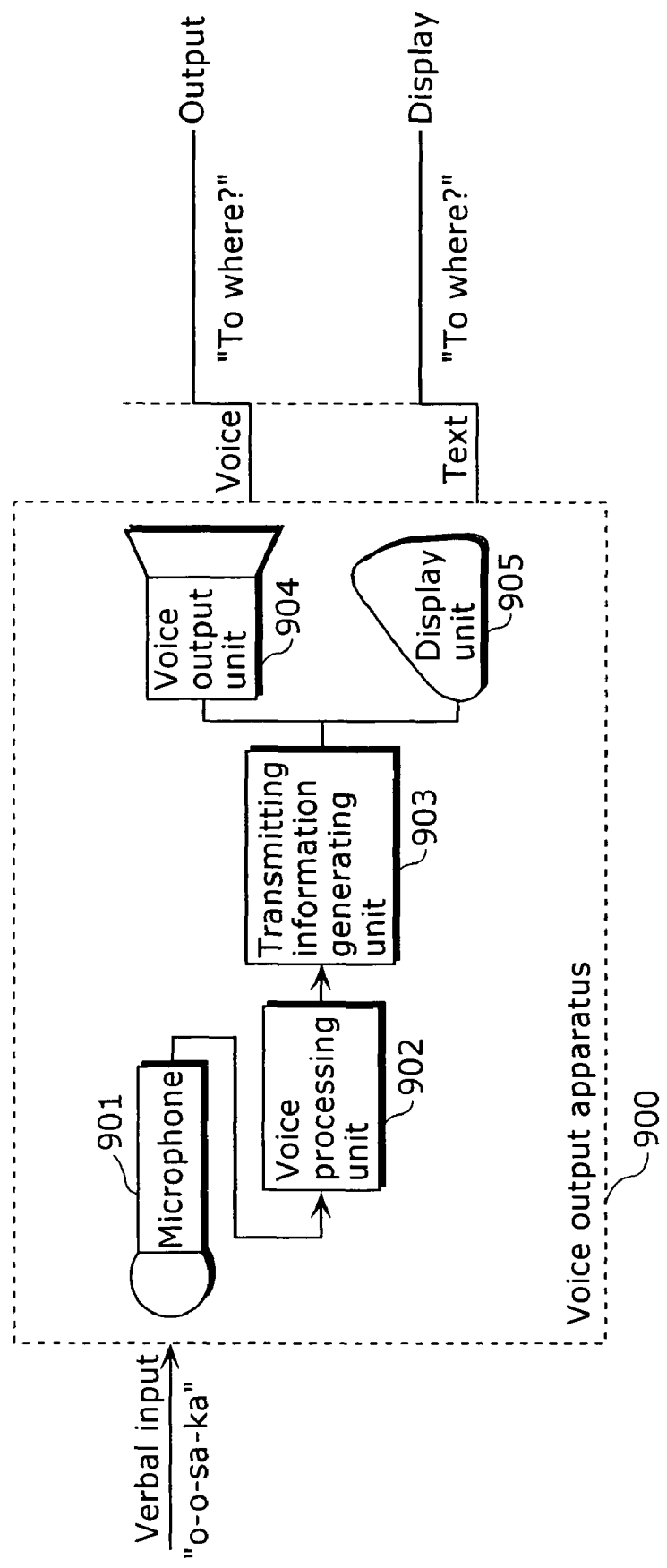
FIG. 1 is a diagram showing the structure of the conventional voice output apparatus that transmits information via voice message and text message.
Figure 2:
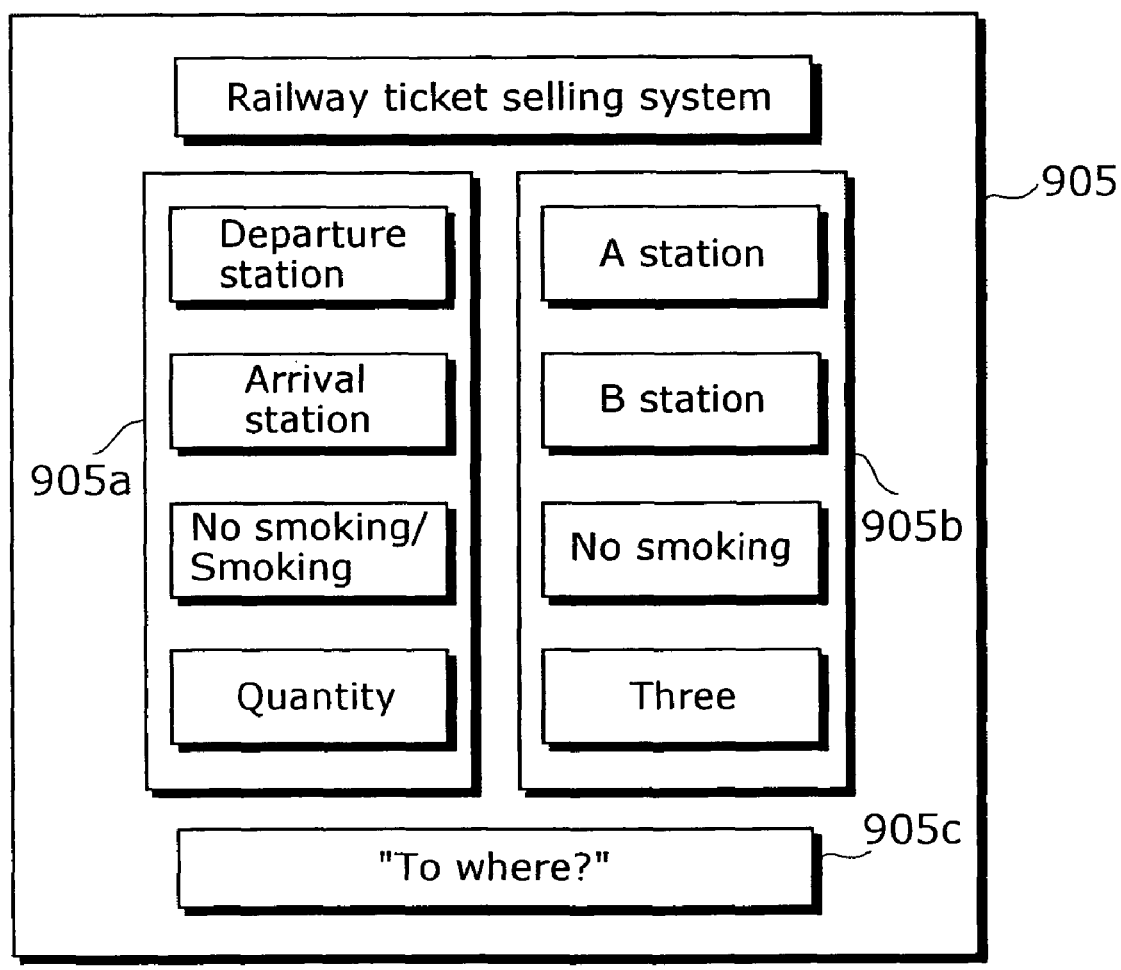
FIG. 2 is a diagram showing an example of the screen displayed by the display unit in the conventional voice output apparatus.
Figure 3:
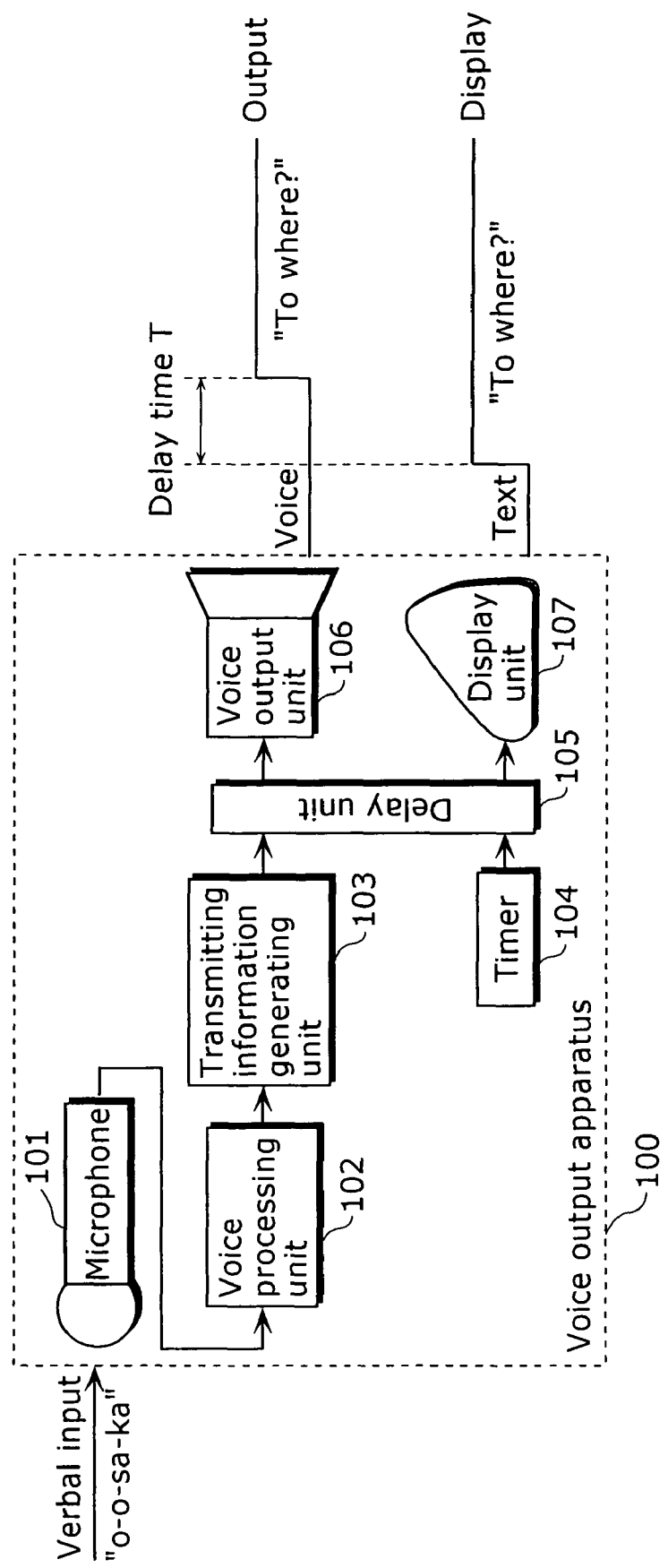
FIG. 3 is a diagram showing the structure of a voice output apparatus according to an embodiment of the invention.

FIG. 3 is a diagram showing the structure of the voice output apparatus according to the embodiment.

The voice output apparatus 100 according to the present embodiment is to output, via voice message, the information to be transmitted to the user, as well as to display the text message presenting the information. The voice output apparatus 100 is comprised of a microphone 101, a voice processing unit 102, a transmitting information generating unit 103, a timer 104, a display unit 105, a voice output unit 106 and a display unit 107.

Such voice output apparatus 100 is characteristic in that it allows the user to surely recognize a voice message and a text message, by delaying the time to output the voice message after the time to display the text message, by the time necessary for a human being to visually identify the message (to be referred to as "delay time" hereinafter).

The microphone 101 obtains a verbal input from the user.

The voice processing unit 102 specifies the user-transmitting information that the user tries to transmit to the voice output apparatus 100, based on the verbal input obtained by the microphone 101, and outputs the user-transmitting information to the transmitting information generating unit 103. For example, when the user utters "o-o-sa-ka" to the microphone 101, the voice processing unit 102 specifies a name of stations "Osaka Station" as the user-transmitting information.

The transmitting information generating unit 103 generates the apparatus-transmitting information to be transmitted to the user, based on the user-transmitting information specified by the voice processing unit 102, and outputs the apparatus-transmitting information to the delay unit 105. For example, in the case where the user-transmitting information indicates "Osaka Station" that is a departure station, the transmitting information generating unit 103 generates the apparatus-transmitting information inquiring an arrival station, and outputs the apparatus-transmitting information.

The timer 104 measures time according to the instruction from the delay unit 105, and outputs the result to the delay unit 105.

The delay unit 105, having obtained the apparatus-transmitting information from the transmitting information generating unit 103, outputs the apparatus-transmitting information to the display unit 107 as well as allows the timer 104 to start measuring time. The delay unit 105 then estimates the delay time mentioned above, according to the display mode of the text message displayed by the display unit 107, and outputs the apparatus-transmitting information to the voice output unit 106 when the time measured by the timer 104 equals to the delay time.

The display unit 107, having obtained the apparatus-transmitting information from the delay unit 105, displays the apparatus-transmitting information via text message. For example, the display unit 107, having obtained the apparatus-transmitting information inquiring an arrival station, displays the text message that goes "To where?".

The voice output unit 106, having obtained the apparatus-transmitting information from the delay unit 105, outputs the apparatus-transmitting information via voice message. For instance, when obtaining the apparatus-transmitting information inquiring an arrival station, the voice output unit 106 outputs a voice message that says "To where?".

Figure 4:
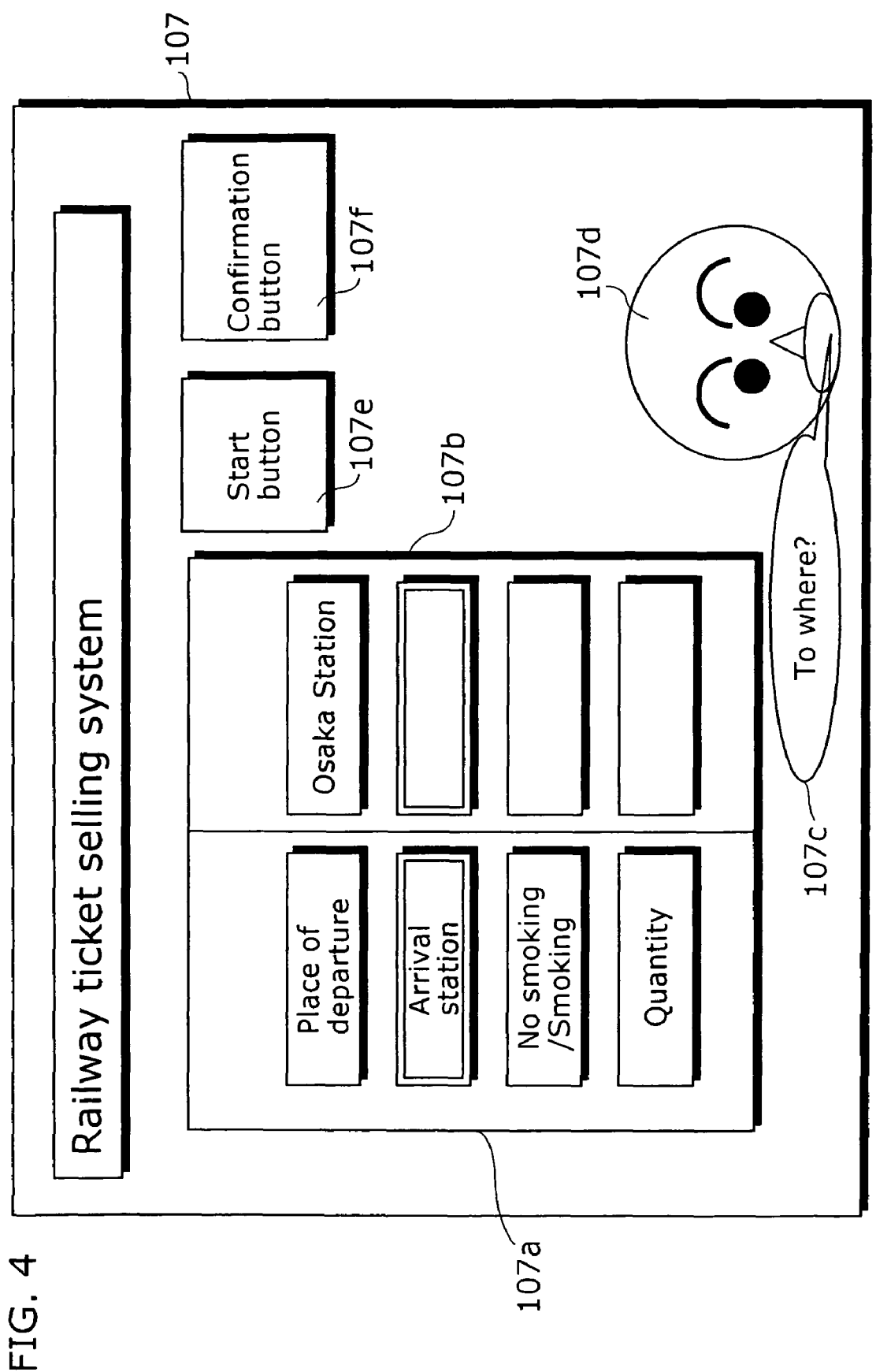
FIG. 4 is a diagram showing an example of the screen displayed by the display unit in the voice output apparatus according to the embodiment.

FIG. 4 shows an example of the screen displayed by the display unit 107 in the voice output apparatus 100.

The display unit 107 displays a condition section 107a, a specification section 107b, a question section 107c, an agent 107d, a start button 107e and a confirmation button 107f.

The questions to be directed to the user e.g. departure station, arrival station and the like, are displayed in the condition section 107a, while the name of stations transmitted by the user and the like are displayed in the specification section 107b, and the apparatus-transmitting information described above is transmitted via text message as shown in the question section 107c. The text message in the question section 107c is displayed as if the agent 107d talks.

The starting button 107e, selected by the user, starts the ticket selling operation performed by the voice output apparatus 100 in interactive mode.

The confirmation button 107f, selected by the user, starts issuing a ticket according to the information such as departure station and arrival station obtained from the user.

Figure 5:
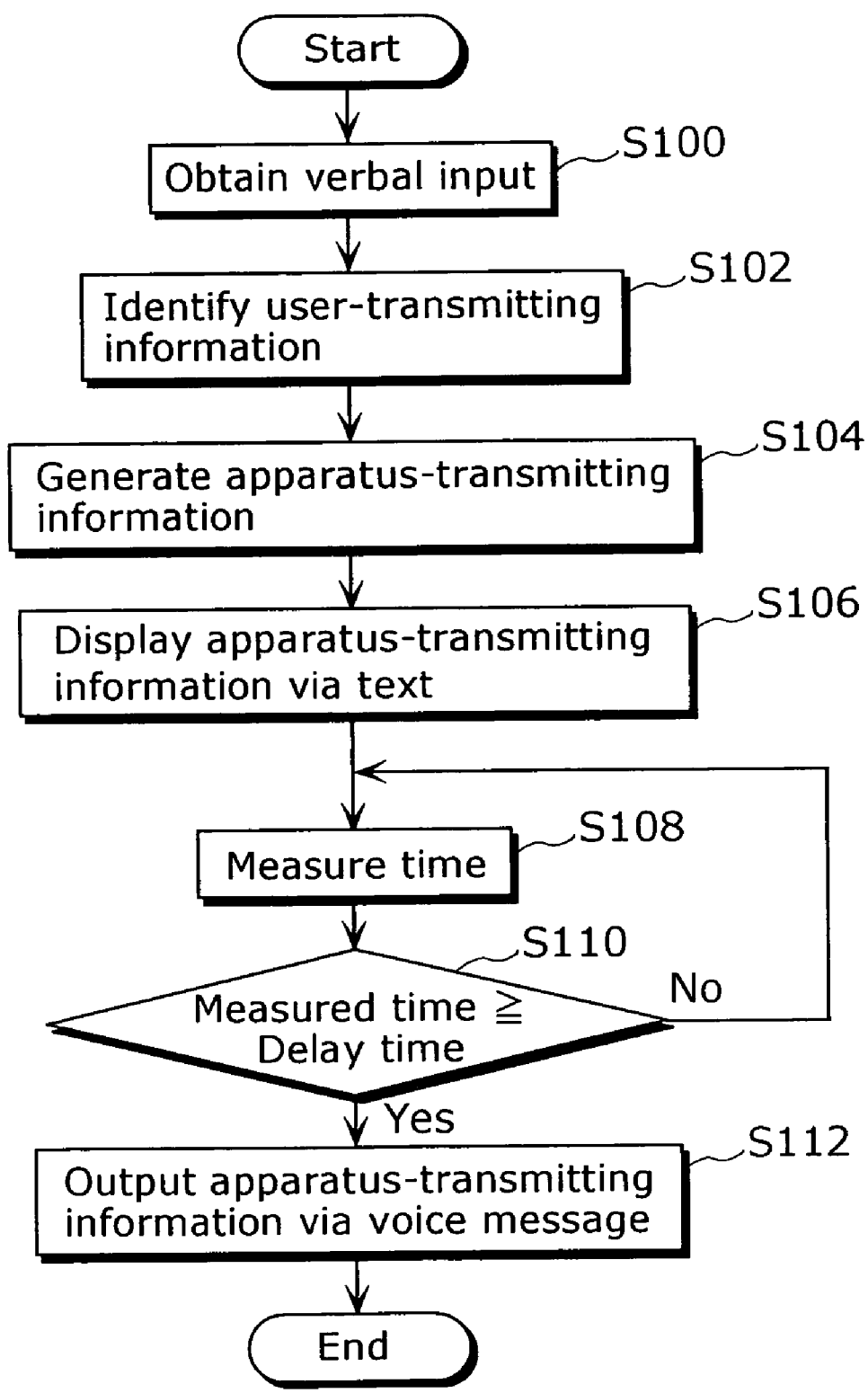
FIG. 5 is a flowchart showing the operation performed by the voice output apparatus according to the embodiment.

FIG. 5 is a flowchart showing the operation performed by the voice output apparatus 100.

The voice output apparatus 100 obtains a verbal input from the user (Step S100), and specifies the user-transmitting information based on the obtained verbal input (Step S102).

The voice output apparatus 100 then generates, based on the user-transmitting information, the apparatus-transmitting information that corresponds to the user-transmitting information (Step S104), and displays the apparatus-transmitting information via text message (Step S106) as well as starts measuring time (Step S108).

Thus, starting the time measuring, the voice output apparatus 100 estimates a delay time "T" by taking the display mode of the text message into account, and judges whether or not the measured time is greater than the delay time "T" (Step 110). Here, judging that the measured time is less than the delay time "T" (No in Step S110), the voice output apparatus 100 repeatedly executes the operation starting from Step S108. That is to say, the voice output apparatus 100 continues to measure the time. Judging that the measured time is greater than the delay time "T" (Yes in Step S110), the voice output apparatus 100 outputs the apparatus-transmitting information via voice message (Step S112).

Here, the delay unit 105 estimates the delay time "T" in consideration of a movement starting time "Ta", a moving time "Tb" and a focusing time "Tc" according to the display mode of the text message displayed by the display unit 107.

The movement starting time "Ta" is a time necessary for the user's line of sight to move toward the text message after the display of the text message. For example, the movement starting time "Ta" is a time necessary for the user to focus off the agent 107d that is a focal point, in the case where the text message "To where?" is displayed in the question section 107c when the user is looking at the agent 107d displayed by the display unit 107.

The moving time "Tb" is a time necessary for the user's line of sight to reach the text message after starting the movement toward the text message. For example, in the case where the distance between the agent 107d on which the user focuses and the text message in the question section 107c is long, the distance by which the focal point moves naturally gets longer, and the moving time "Tb" gets longer, accordingly. In such case, the delay time "T" needs to be determined by taking the moving time "Tb" into consideration.

The focusing time "Tc" is a time necessary for the user's line of sight to focus on the text after it reaches the text message. Generally speaking, when one moves the focal point from the object which he/she was focusing on in order to see another object, the more the focusing point varies, the longer the moving distance is. Such focusing time "Tc" is therefore determined according to the moving distance of the focal point.

Here, the movement starting time "Ta" will be explained in detail.

The movement starting time "Ta" changes depending on the size of the characters displayed in the text message. When the size of the characters gets larger, the user's attention is strongly attracted to the text, and the movement starting time "Ta" gets shorter. When the size of the characters gets smaller, the power to attract the user's attention is weak and the movement starting time "Ta" gets longer. For example, assuming that a reference character size is represented by 10 points, the power to attract user's attention gets stronger as the character size is larger than 10 points, and the movement starting time "Ta" gets shorter, accordingly.

The delay unit 105 derives the movement starting time "Ta" based on the Equation 1 below.

$$Ta = t0 - \alpha 0$$ (Equation 1)

"t0" denotes a predetermined time necessary for reducing the size of characters as much as possible. The movement starting time "Ta" can be derived by subtracting, from the time "t0", the time "α0" which changes according to the character size.

The delay unit 105 derives the time "α0" based on the Equation 2 below.

$$\alpha 0 = t1 * f0(X) \qquad \text{(Equation 2)}$$

"X" denotes a character size while "t1" denotes a maximum time that can be abbreviated based on the character size "X". Note that the sign "*" signifies a product.

Function "f0(X)" is expressed by Equation 3 below.

$$f0(X) = 1/(1+\exp(-((X-XA)/(XC-XA)-0.5)/0.1)) \qquad \text{(Equation 3)}$$

"XA" denotes a reference character size (e.g. 10 points) for determining the movement starting time "Ta" whereas "XC" denotes a maximum character size (e.g. 38 points) for determining the movement starting time Ta. Note that "exp" denotes a base of natural logarithm and "exp(A)" denotes an "A" th degree to the base of natural logarithm.

Such function "f0(X)" is a sigmoid function that is frequently used as a model for an ecosystem. That is to say, it is possible to derive, according to the character size "X", the movement starting time "Ta" suitable for the eye movement characteristics.

Figure 6:
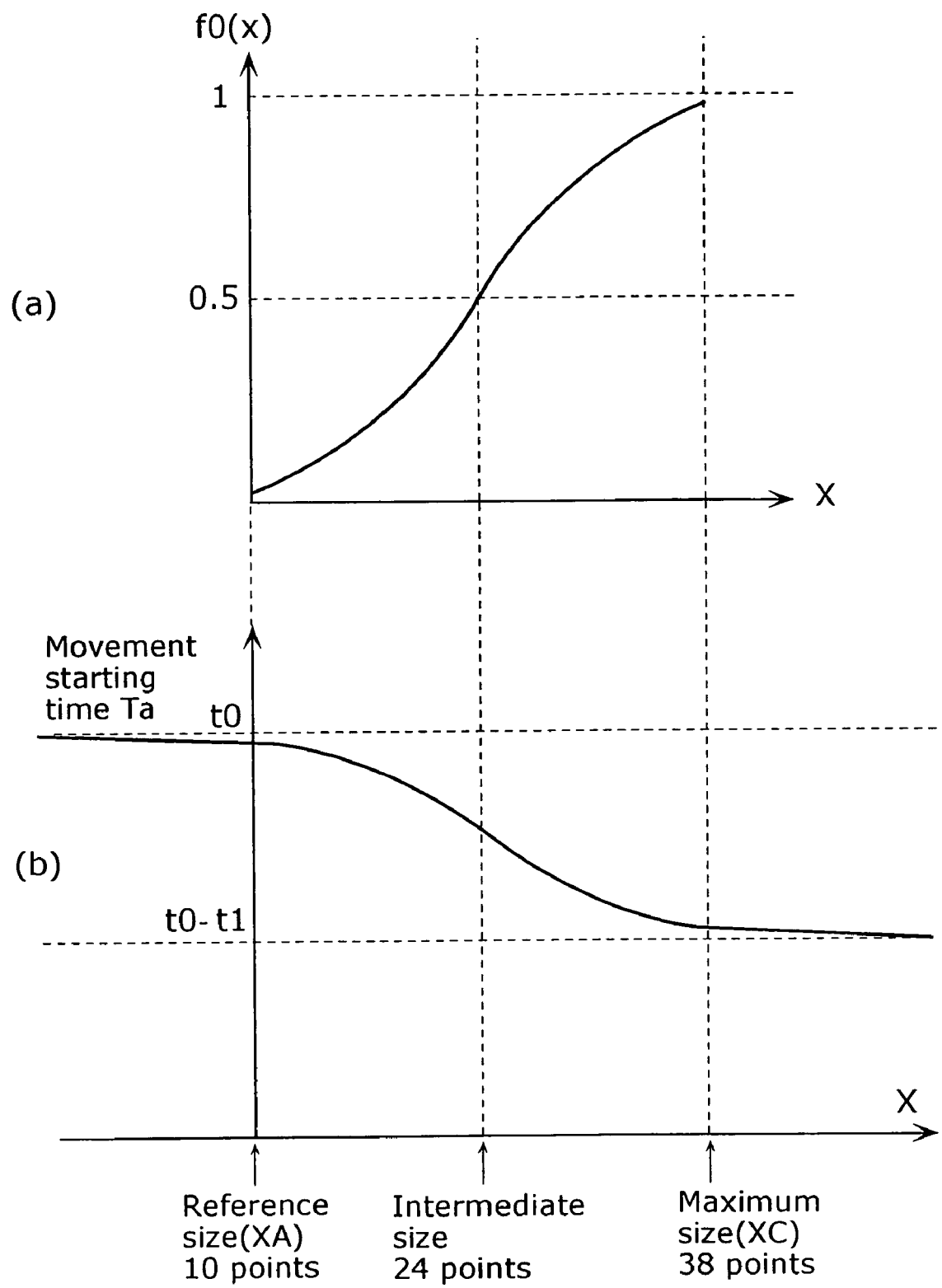
FIG. 6 is a diagram showing a relationship established by a function "f0 (X)", a movement starting time "Ta" and a character size "X", according to the embodiment.

FIG. 6 is a diagram showing a relationship established by the function "f0 (X)", the movement starting time "Ta" and the character size "X", according to the embodiment.

As shown in (a) in FIG. 6, the value presented by the function "f0(X)" increases as the character size "X" changes from the reference size "XA" to the maximum size "XC". That is to say that the value increases as the character size "X" increases: the value increases moderately in the vicinity of the reference size "XA" (i.e. 10 points), but increases at a faster rate around an intermediate size (i.e. 24 points), and the increase slows down again at the maximum size "XC" (i.e. 38 points).

Therefore, as shown in (b) in FIG. 6, the movement starting time "Ta" decreases as the character size "X" increases: moderately decreases in the vicinity of the reference size "XA", decreases at a faster rate around the intermediate size, and decreases slowly again when nearing the maximum size "XC".

Here, the function expressed by Equation 4 may be used in stead of the function "f0(X)".

$$f1(X) = 1/(1+\exp(-S*((X-XA)/(XC-XA)-0.5)/0.1)) \qquad \text{(Equation 4)}$$

"S" denotes a variable for determining a slope at a turning point in sigmoid function.

Figure 7:
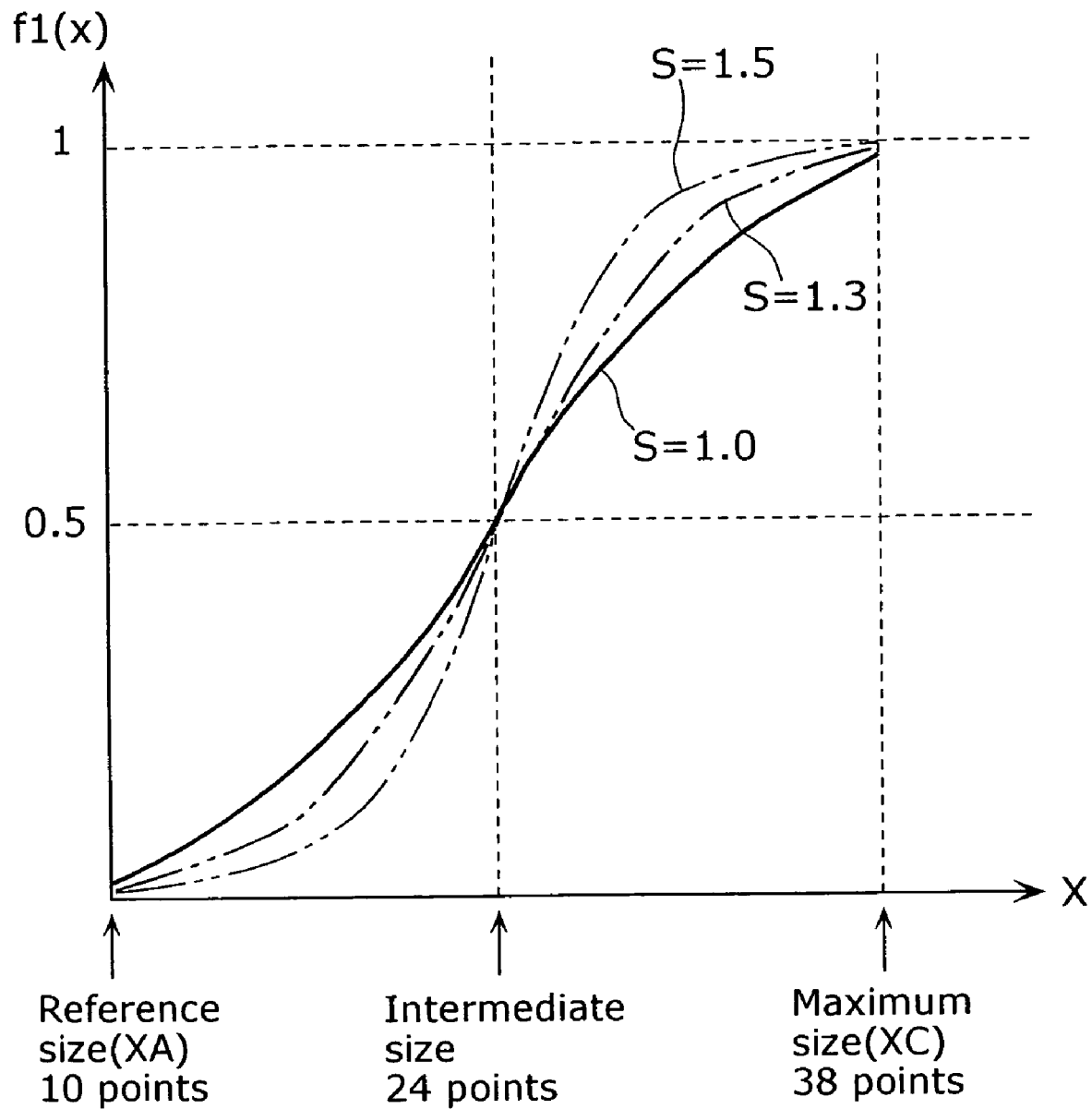
FIG. 7 is a diagram showing a function "f1 (X)" which changes depending on a value of a variable S, according to the embodiment.

FIG. 7 is a diagram showing the function "f1(X)" which changes according to the variable "S".

As shown in FIG. 7, the value presented in the function "f1(X)" changes slowly around the turning point (i.e. intermediate size) when the variable "S" becomes smaller, and changes greatly in the vicinity of the turning point when the variable "S" becomes larger. By setting the variable "S" to an appropriate value, it is possible to derive more precisely the movement starting time "Ta".

The following describes in detail the moving time "Tb".

The moving time "Tb" can be determined based on the distance between the agent 107*d* being a focal point and the question section 107*c* (to be referred to as "text display distance" hereinafter).

The delay unit 105 derives the moving time "Tb" based on Equation 5 below.

$$Tb = t0 + \alpha 1 \qquad \text{(Equation 5)}$$

"t0" denotes a predetermined time to be required when the text display distance is "0". The moving time "Tb" can be derived by adding the time "α1" that changes against the time "t0" according to the text display distance.

The delay unit 105 derives the time "α1" based on Equation 6 below.

$$\alpha 1 = t2 * f2(L) \qquad \text{(Equation 6)}$$

"L" denotes a text display distance while "t2" denotes a maximum possible time to be extended by the text display distance "L".

The function "f2(L)" is expressed by Equation 7 below.

$$f2(L) = 1/(1+\exp(-((L-LA)/(LC-LA)-0.5)/0.1)) \qquad \text{(Equation 7)}$$

"LA" denotes a reference distance while "LC" denotes a maximum distance. For example, the reference distance is 0 cm and the maximum distance is 10 cm.

Such function "f2(L)" is a sigmoid function frequently used as a model for ecosystem. That is to say, by using such function "f2(L)", it is possible to derive, according to the text display distance "L", the moving time "Tb" that corresponds to the eye movement characteristics.

The text display distance "L" is expressed by Equation 8 below.

$$L = \text{sqrt}((px-qx)^2 + (py-qy)^2) \qquad \text{(Equation 8)}$$

"px" and "py" respectively denote X-axis and Y-axis indicating a location of the text displayed in the question section 107*c* while "qx" and "qy" respectively denote X-axis and Y-axis indicating a location of the agent 107*d*. Note that "sqrt" signifies a root and "sqrt (A)" signifies a root of "A". The sign "^" signifies a power while "(A)^(B)" signifies a "B" th power to "A".

Figure 8:
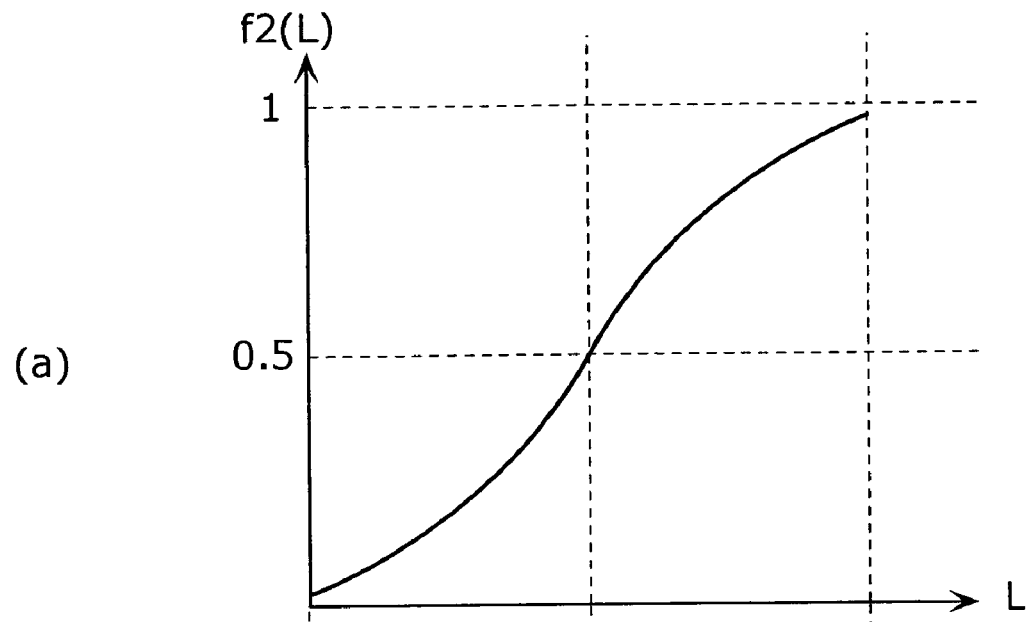
FIG. 8 is a diagram showing a relationship established by a function "f2 (L)", a moving time "Tb" and a text display distance L, according to the embodiment.
Figure 8:
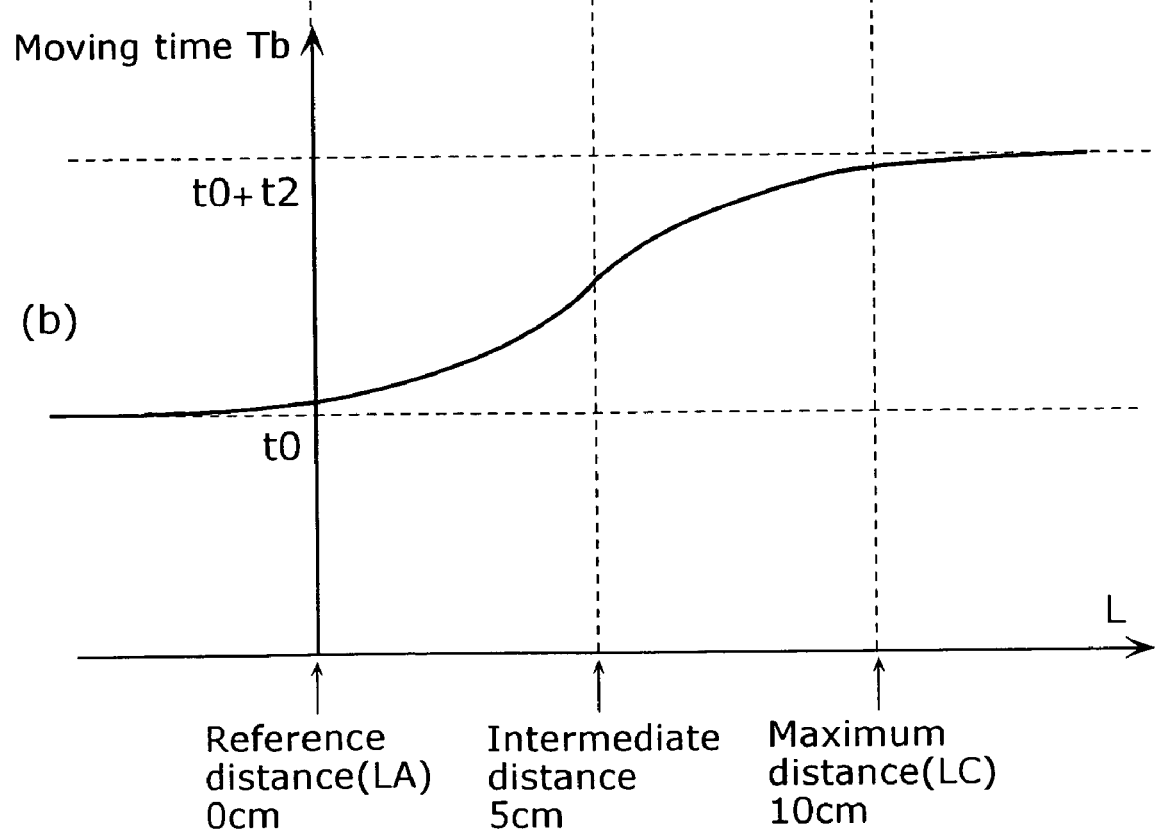

FIG. 8 shows a relationship established by the function "f2 (L)", the moving time "Tb" and the text display distance "L".

As shown in (a) in FIG. 8, the value presented in the function "f2 (L)" increases as the text display distance "L" changes from the reference distance "LA" to the maximum distance "LC". Namely, the value increases moderately around the reference distance "LA" (0 cm) according to the increase in the text display distance "L", increases at a faster rate in the vicinity of the intermediate distance (5 cm), and again increases slowly around the maximum distance "LC" (10 cm).

Therefore, as shown in (b) in FIG. 8, the moving time "Tb" increases moderately as the text display distance "L" increases, then increases at a faster rate around the intermediate distance, and increases slowly around the maximum distance "LC".

Note that in the above description, the text display distance "L" is defined to range from the position of the agent 107*d* to the position of the text in the question section 107*c*. In the case where the agent 107*d* is not displayed, however, the text display distance "L" may be the distance between the centre of the screen that is set as a focal point, and the position of the text.

Next, the focusing time "Tc" will be explained in detail.

The focusing time "Tc" is determined according to the text display distance "L", as is the case of determining the moving distance "Tb".

The delay unit 105 derives the focusing time "Tc" based on Equation 9 below.

$$Tc = t0 + \alpha 2 \qquad \text{(Equation 9)}$$

"t0" denotes a predetermined time to be required when the text display distance "L" is "0". The focusing time "Tc"

derived by adding, to the time "t0", the time "α2" which changes according to the text display distance "L".

The delay unit 105 derives the time "α2" based on the following Equation 10.

$$\alpha 2 = t3 * f2(L) \qquad \text{(Equation 10)}$$

"t3" denotes a maximum time that is extendable based on the text display distance "L". The function "f2(L)" is expressed by the Equation 7 explained above.

By using the function "f2(L)" as described above, the focusing time "Tc" that corresponds to the eye movement characteristics in accordance with the text display distance "L" can be derived.

Figure 9:
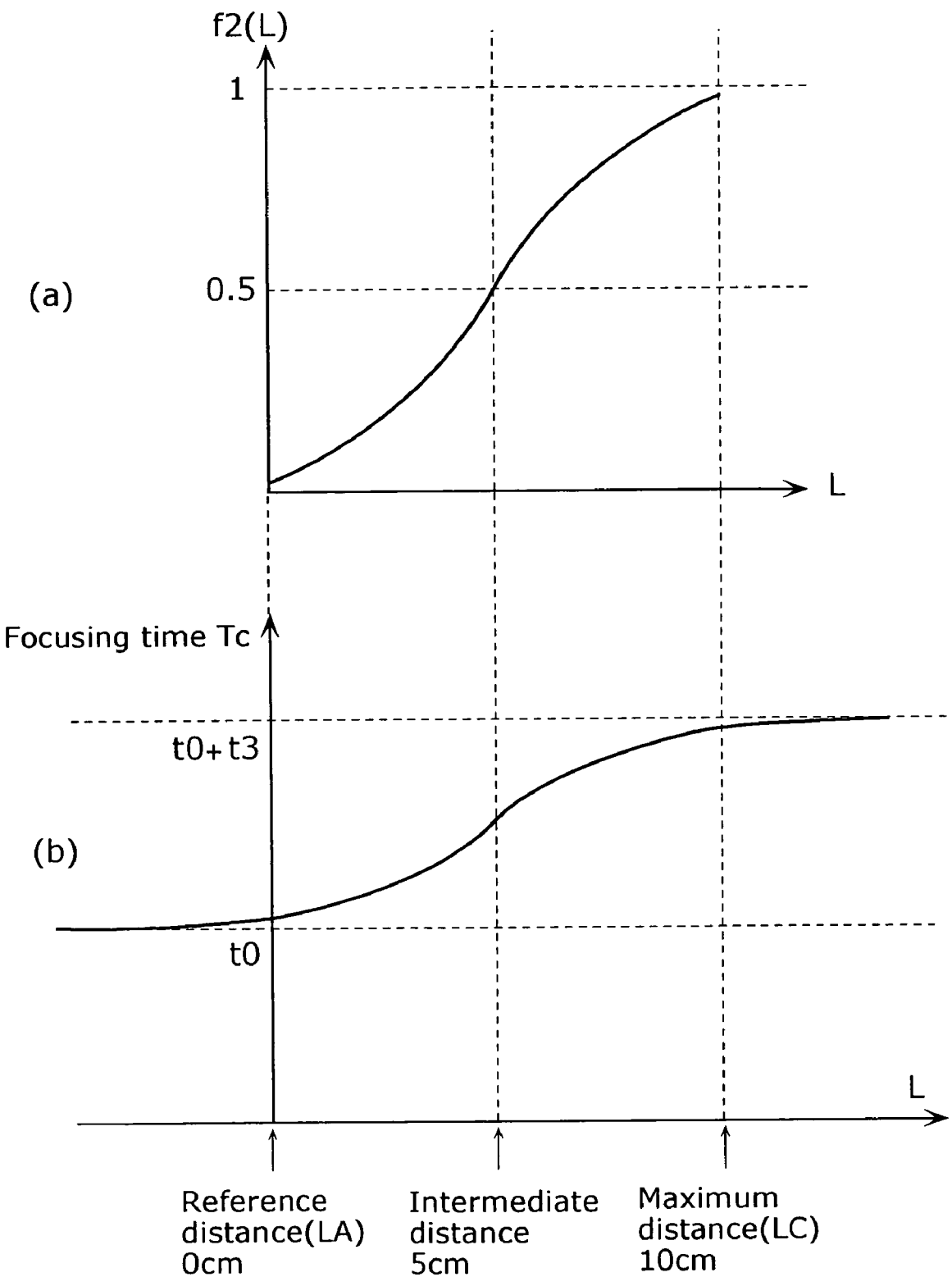
FIG. 9 is a diagram showing a relationship established by the function "f2 (L)", a focusing time "Tc" and a text display distance "L", according to the embodiment.

FIG. 9 is a diagram showing a relationship established by the function "f2(L)", the focusing time "Tc" and the text display distance "L", according to the embodiment.

As shown in (a) in FIG. 9, the value indicated by the function "f2 (L)" increases as the text display distance "L" changes from the reference distance "LA" to the maximum distance "LC".

Therefore, as shown in (b) in FIG. 9, the focusing time "Tc" increases as follows: moderately around the reference distance "LA" according to the increase in the text display distance "L"; then at a faster rate in the vicinity of the intermediate distance; and then again slowly around the maximum distance "LC".

The delay unit 105 derives the delay time "T" based on the following Equation 11 by taking the movement starting time "Ta", the moving time "Tb" and the focusing time "Tc" into consideration.

$$T = t0 - \alpha 0 + \alpha + \alpha 1 + \alpha 2 \qquad \text{(Equation 11)}$$

In this way, by deriving the delay time "T" in consideration of the movement starting time "Ta", the moving time "Tb" and the focusing time "Tc", it is possible to obtain an exact time, for the delay time "T", in accordance with the movement of line of sight.

As described above, it is possible, in the present embodiment, for the user to simultaneously recognize a text message and a voice message since the delay time "T" required for the user to visually identify the text message is estimated, and after the delay time "T" has passed, the voice message is outputted after the display of the text message. As a result, it is possible to enhance the robustness of the interface between the user and the apparatus by surely transmitting the information via text message and voice message to the user.

Here, in the case where the screen of the display unit 107 is small, as is the case of the display of a portable terminal such as a Personal Digital Assistant (PDA), the times "α1" and "α2" may be predetermined irrespective of the text display distance "L". Namely, the times "α1" and "α2" shall respectively be an average of the time possibly obtained according to the change in the text display distance "L". The delay unit 105 derives the delay time "T" based on the following Equation 12, by thus regarding the respective times "α1" and "α2" as average time.

$$T = t0 - \alpha 0 + \text{average}(\alpha 1) + \text{average}(\alpha 2) \qquad \text{(Equation 12)}$$

"average (α1)" denotes an average time of the time "α1" while "average (α2)" denotes an average time of the time "α2".

It is possible to simplify the calculation by reducing the number of parameters for deriving a delay time "T", thus using average times. Consequently, it is possible to speed up the calculation for obtaining a delay time "T", and further simplify the structure of the delay unit 105.

It is also possible to avoid an excessive increase of the delay time "T" by setting the upper limit for the delay time "T".

(First Variation)

The following describes the first variation of the voice output apparatus according to the present embodiment.

The voice output apparatus according to the present variation is to estimate a delay time for each user, that is, to estimate the delay time according to the user's age.

The timing to move the eyeballs, a moving speed, and a focusing speed are usually slowed down with aging so that the movement starting time "Ta", the moving time "Tb" and the focusing time "Tc" also get longer, accordingly. The voice output apparatus according to the present variation estimates a delay time by taking user's age into account.

Figure 10:
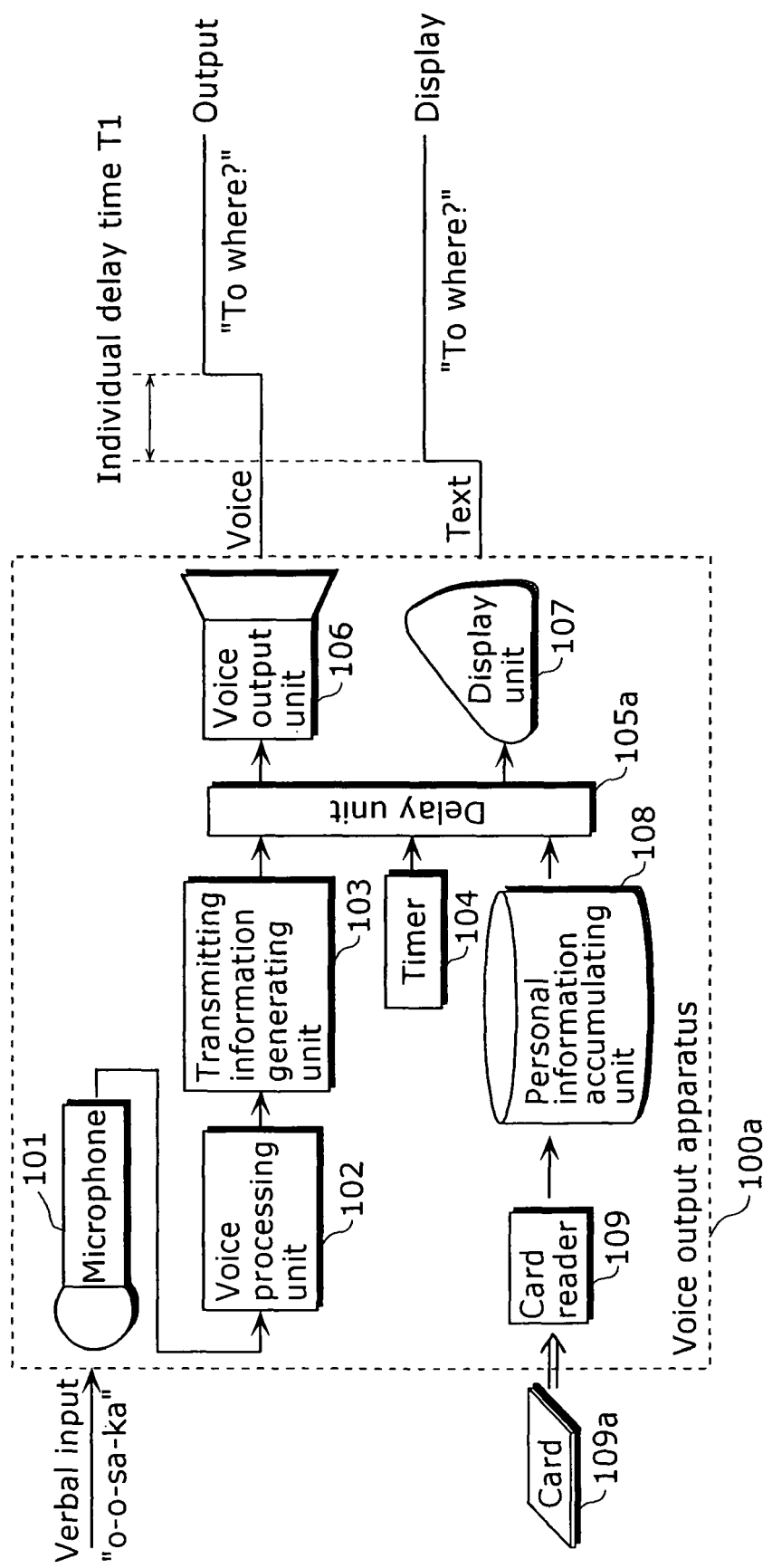
FIG. 10 is a diagram showing the structure of a voice output apparatus according to a first variation.

FIG. 10 is a diagram showing the structure of the voice output apparatus according to the first variation.

The voice output apparatus 100a according to the first variation is comprised of the microphone 101, the voice processing unit 102, the transmitting information generating unit 103, the timer 104, a delay unit 105a, the voice output unit 106, the display unit 107, a card reader 109 and a personal information accumulating unit 108.

The card reader 109 reads personal information such as age and date of birth from the card 109a inserted into the voice output apparatus 100a, and stores the read-out personal information into the personal information accumulating unit 108.

The delay unit 105a firstly derives a delay time "T", considering the movement starting time "Ta", the moving time "Tb" and the focusing time "Tc". The delay unit 105a then refers to the personal information stored in the personal information accumulating unit 108, and derives, based on the delay time "T", the individual delay time "T1" where the personal information is taken into account. After letting the voice output unit 106 to output the apparatus-transmitting information via voice message, the delay unit 105a further allows the display unit 107 to display the apparatus-transmitting information via text message after the individual delay time "T1" has passed.

The delay unit 105a derives the individual delay time "T1" based on the following Equation 13.

$$T1 = T + \alpha 3 \qquad \text{(Equation 13)}$$

The individual delay time "T1" is derived by adding, to the delay time "T", the time "α3" that changes according to user's age.

The delay unit 105a derives the time "α3" based on Equation 14 below.

$$\alpha 3 = t4 * f3(M) \qquad \text{(Equation 14)}$$

"M" denotes age while "t4" denotes a maximum time that is extendable according to the age "M".

The function "f3(M)" is expressed by the following Equation 15.

$$f3(M) = 1/(1 + \exp(-((M-20)/(60-20) - 0.5)/0.1) \qquad \text{(Equation 15)}$$

The value presented in the function "f3(M)" increases with aging, therefore, the individual delay time "T1" also increases according to the increase in age.

Figure 11:
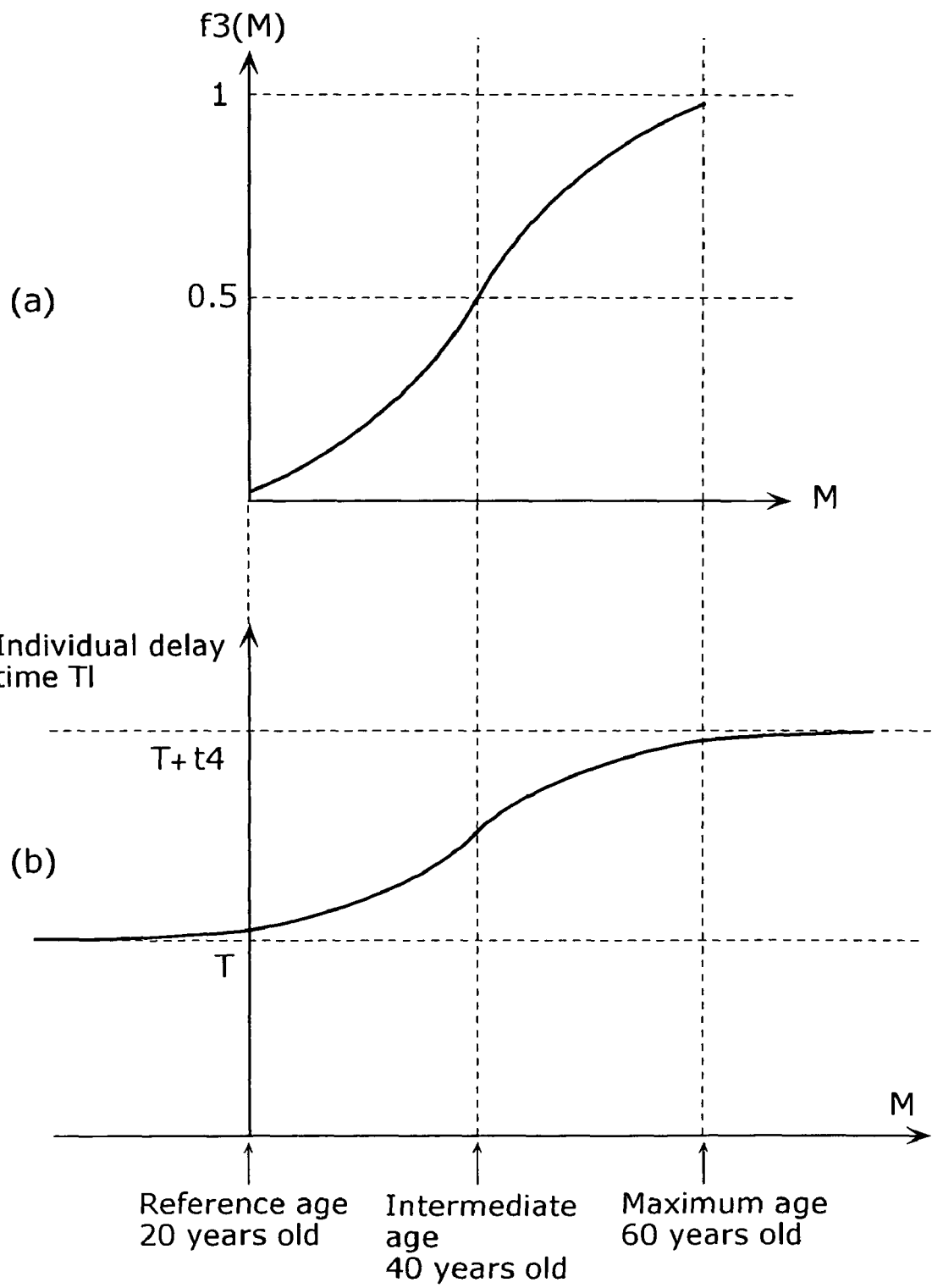
FIG. 11 is a diagram showing a relationship established by a function "f3 (M)", an individual delay time "T1" and an age "M", according to the first variation.

FIG. 11 is a diagram showing a relationship established by the function "f3(M)", the individual delay time "T1" and the age "M".

As shown in (a) in FIG. 11, the value presented in the function "f3(M)" increases as the age "M" changes from 20 to 60. Namely, this value increases slowly around 20 years old (i.e. reference age) with active physical capabilities, but increases at a faster rate around 40 years old (i.e. intermediate age), and then again increases slowly in the vicinity of 60 years old (i.e. maximum age) with decreased physical abilities.

Therefore, as shown in (b) in FIG. 11, the individual delay time "T1" increases moderately around the reference age according to the increase in age, but increases at a faster rate in the vicinity of the intermediate age, and increases moderately again around the maximum age.

Thus in the variation, it is possible to improve the robustness of the interface between each user and the apparatus because the individual delay time "T1" is derived by taking user's age into consideration, and after the individual delay time "T1" has passed, the voice message is outputted after the display of the text message.

Note that, in the present variation, user's age is used as personal information, however, reaction rate, eyeball-speed, focusing speed, alertness, and usage history may be used instead. In such case, personal information such as a reaction rate shall be registered beforehand in a card $109a$ so that the card reader 109 reads the personal information from the card $109a$ and stores it in the personal information accumulating unit 108. The delay unit $105a$ refers to the personal information such as the reaction rate stored in the personal information accumulating unit 108 so as to derive the individual delay time "T1" where the reaction rate is considered, based on the delay time "T".

(Second Variation)

The following describes the second variation of the voice output apparatus according to the present embodiment.

The voice output apparatus according to the present variation is to estimate a delay time in accordance with user's habituation, and estimates the delay time according to the number of user's operations.

In general, with the increase in the number of times, the user operates the voice output apparatus, the user gets accustomed to the operation so that the movement starting time "Ta", the moving time "Tb" and the focusing time "Tc" become shorter.

For example, as the user proceeds in the interactive operations in the sequence of operations for purchasing a ticket, the user learns the position of the text display and timing. Consequently, the user can effectively perform the operation of focusing on a text message after the display of the text message. The voice output apparatus according to the present variation therefore estimates the delay time by considering the number of user's operations.

Figure 12:
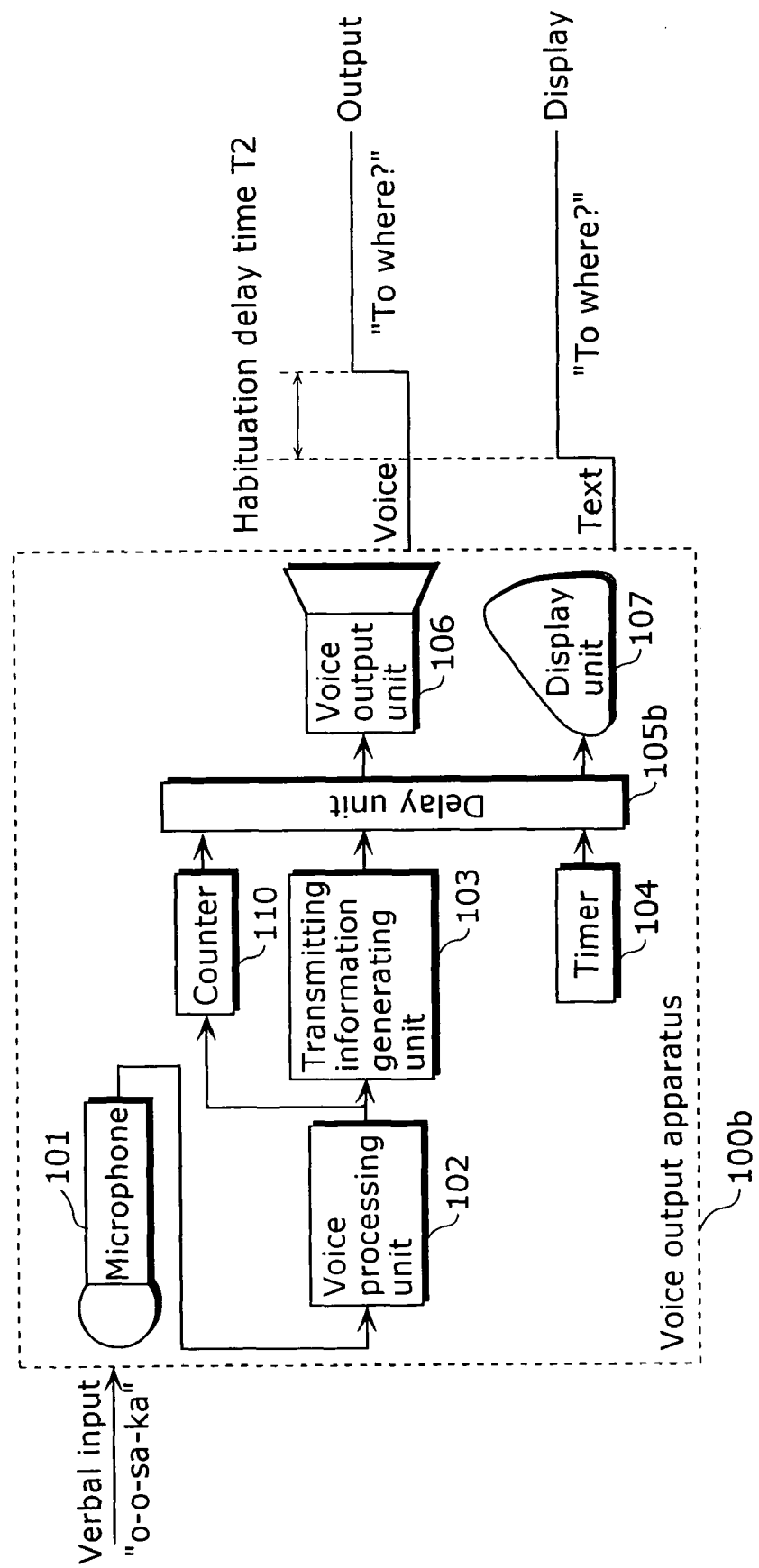
FIG. 12 is a diagram showing the structure of a voice output apparatus according to a second variation.

FIG. 12 is a diagram showing the structure of the voice output apparatus according to the second variation.

The voice output apparatus $100b$ according to the second variation is comprised of the microphone 101, the voice processing unit 102, the transmitting information generating unit 103, the timer 104, a delay unit $105b$, the voice output unit 106, the display unit 107, and a counter 110.

The counter 110, having obtained the user-transmitting information outputted from the voice processing unit 102, counts the number of obtainments, that is, the number of times the user operates the voice output apparatus $100b$, and informs the delay unit $105b$ of the number of operation times.

The delay unit $105b$ firstly derives a delay time "T" where the movement starting time "Ta", the moving time "Tb" and the focusing time "Tc" are taken into consideration. The delay unit $105b$ refers to the operation time informed of by the counter 110, and derives, based on the delay time "T", the habituation delay time "T2" where the number of operations is taken into account. After allowing the voice output unit 106 to output the apparatus-transmitting information via voice message, the delay unit $105b$ further allows the display unit 107 to display the apparatus-transmitting information via text message after the habituation delay time "T2" has passed.

The delay unit $105b$ derives the habituation time "T2" based on the following Equation 16.

$$T2 = T - \alpha 4 \qquad \text{(Equation 16)}$$

The habituation delay time "T2" is derived by subtracting, from the delay time "T", the time "$\alpha 4$" that changes according to the operation frequency.

The delay time $105b$ derives the time "$\alpha 4$" based on the following Equation 17.

$$\alpha 4 = t5 * f4(K) \qquad \text{(Equation 17)}$$

"K" denotes the number of operations while "t5" denotes a maximum time that can be reduced according to the operation frequency "K".

The function "f4(K)" is expressed by the following Equation 18.

$$f4(K) = 1/(1 + \exp(-K/KC - 0.5)/0.1)) \qquad \text{(Equation 18)}$$

Here "KC" presents the maximum value indicating the number of operations, based on which the habituation delay time "T2" becomes the shortest.

The value presented in the function "f4(K)" increases as the operation frequency "K" increases so that the habituation delay time "T2" decreases according to the increase in the operation frequency "K".

Figure 13:
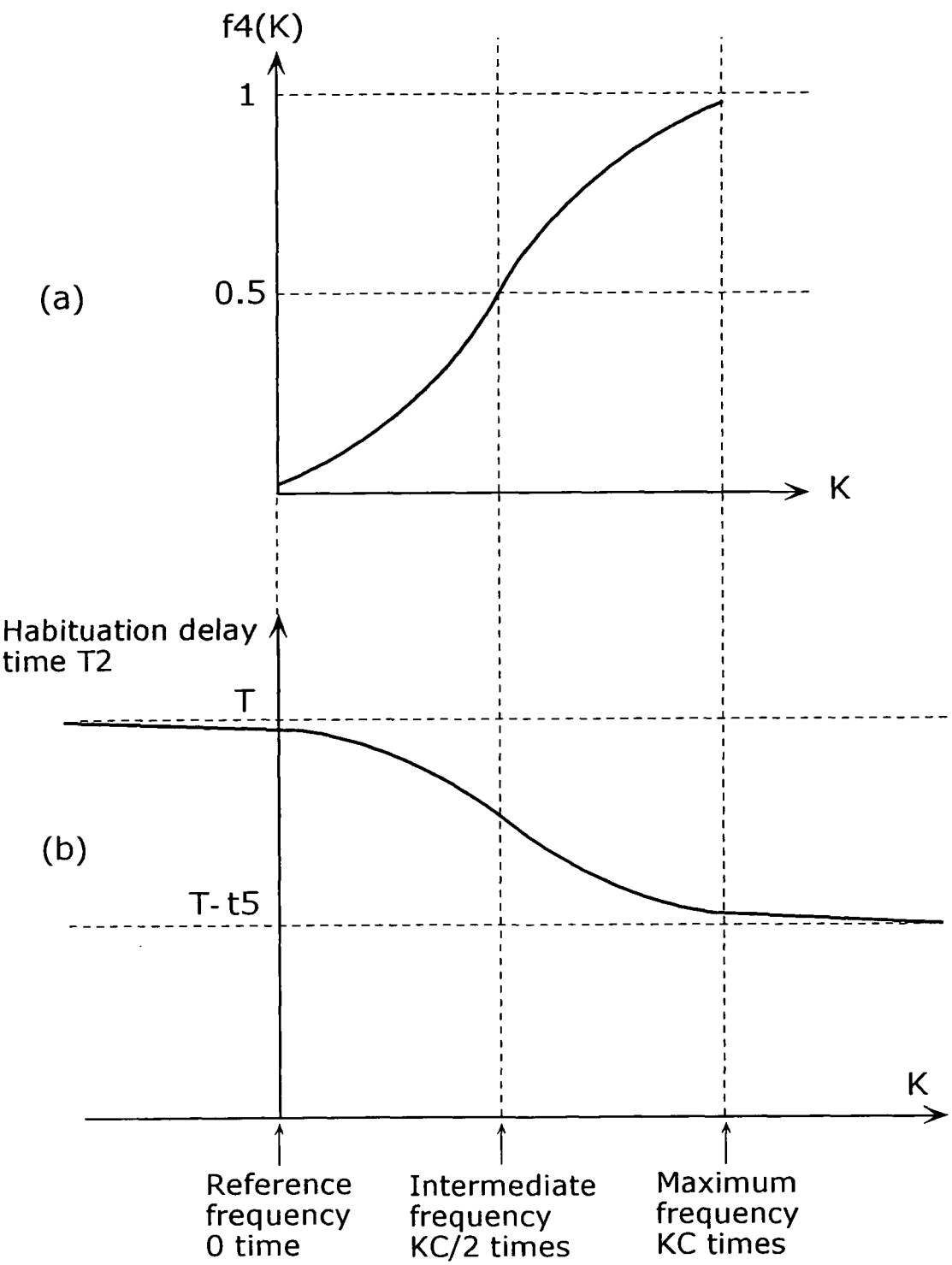
FIG. 13 is a diagram showing a relationship established by a function "f4 (K)", a habituation delay time "T2" and an operation frequency "K", according to the second variation.

FIG. 13 is a diagram showing a relationship established by the function "f4 (K)", the habituation delay time "T2" and the operation frequency "K", according to the embodiment.

As shown in (a) in FIG. 13, the value presented in the function "f4(K)" increases as the operation frequency "K" changes from "0" (i.e. reference frequency) to "KC" (i.e. maximum frequency). Namely, the value increases as the operation time "K" increases: increases moderately around "0" time where the user is not used to operating the apparatus; but increases at a faster rate in the vicinity of KC/2 times (i.e. intermediate frequency) where the user is getting accustomed to the operation; and increases moderately again around "KC" times where the user is sufficiently accustomed to the operation.

Therefore, as shown in (b) in FIG. 13, the habituation delay time "T2" decreases according to the increase in the operation frequency "K": decreases moderately around the reference frequency; decreases at a faster rate in the vicinity of the intermediate frequency; and decreases moderately again around the maximum frequency.

Thus, in the present variation, the habituation delay time "T2" is derived in consideration of user's habituation, and after the habituation delay time "T2" has passed, the voice message is outputted after the display of the text message. The user can therefore maintain the robustness of the interface well-adapted to the user's habituation.

(Third Variation)

The following describes the third variation of the voice output apparatus according to the present embodiment.

The voice output apparatus according to the present variation, as is the case of the second variation, is to estimate a delay time in accordance with user's habituation. More precisely, the voice output apparatus estimates a delay time according to the time during which the user operates the apparatus.

As the time the user operates the voice output apparatus gets longer, the user usually gets accustomed to the operation. The movement starting time "Ta", the moving time "Tb" and the focusing time "Tc" therefore get shorter, accordingly. The voice output apparatus according to the present variation therefore estimates a delay time by considering the time during which the user operates the apparatus.

The voice output apparatus according to the third variation is structured in the same way as the voice output apparatus according to the second variation shown in FIG. 12, however, the difference lies in the operations carried out by the delay unit 105b and the counter 110.

The counter 110 according to the present variation has a function as a time counter, and obtains, from the voice processing unit 102, the user-transmitting information for the first time since the start of the interaction between the voice output apparatus 100b and the user, and measures the elapsing time after obtaining the information, namely, a user's operation time. The counter 110 then informs the delay unit 105b of the operation time.

The delay time 105b derives the delay time "T" where the movement starting time "Ta", the moving time "Tb" and the focusing time "Tc" are taken into consideration. The delay unit 105b then refers to the operation time informed by the counter 110, and derives, based on the delay time "T", the habituation delay time "T3" where the operation time is considered. The delay unit 105b further allows the voice output unit 106 to output the apparatus-transmitting information via voice message, and allows the display unit 107 to display the apparatus-transmitting information via text message after the habituation delay time "T3" has passed.

The delay unit 105b derives the habituation delay time "T3" based on the following Equation 19.

$$T3 = T - \alpha5 \quad \text{(Equation 19)}$$

The habituation delay time "T3" is derived by subtracting, from the delay time "T", the time "α5" that changes according to the operation time.

The delay unit 105b derives the time "α5" based on the following Equation 20.

$$\alpha5 = t6 * f5(P) \quad \text{(Equation 20)}$$

"P" denotes operation time while "t6" denotes a maximum time that can be reduced according to the operation time "P".

The function "f5(P)" is expressed by the following Equation 21.

$$f5(P) = 1/(1+\exp(-(P/PC-0.5)/0.1)) \quad \text{(Equation 21)}$$

Here, "PC" is a maximum value obtained as the operation time "P" based on which the habituation time "T3" becomes the shortest.

The value presented in the function "f5(P)" increases according to the increase in the operation time "P" so that the habituation delay time "T3" decreases according to the increase in the operation time "P".

Thus, in the present variation, as is the case of the second variation, the habituation delay time "T3" is derived by taking user's habituation into consideration, and after the habituation delay time "T3" has elapsed, the voice message is outputted after the display of the text message. It is therefore possible to maintain the robustness of the interface that is adapted to the user's habituation.

Note that, in the present variation, the measurement of the operation time "P" starts in the timing when the voice processing unit 102 outputs the user-transmitting information, that is, the timing when the user utters a word, however, it may be performed in the timing when the power is turned on or when the starting button 107f is selected.

(Fourth Variation)

The following describes the fourth variation related to the method of deriving the movement starting time "Ta" according to the present embodiment.

The movement starting time "Ta" usually varies according not only to the size of characters but also to the location where the text is displayed. That is to say that the nearer the location of the displayed text is to the user's focal point, the earlier the user recognizes the text so that the movement starting time "Ta" gets shorter.

The delay unit 105 according to the present variation derives the movement starting time "Ta" based on the text display distance "L" using the following Equation 22.

$$Ta = t0 + \alpha6 \quad \text{(Equation 22)}$$

"t0" denotes a predetermined time to be required when the text display distance "L" indicates "0". Namely, the movement starting time "Ta" is derived by adding, to the time "t0", the time "α6" that changes according to the text display distance "L".

The delay unit 105 derives the time "α6" based on the following Equation 23.

$$\alpha6 = t7 * f2(L) \quad \text{(Equation 23)}$$

"t7" denotes a maximum time that is extendable according to the text display distance "L". The function "f2(L)" is expressed by the Equation 7.

Thus, in the present variation, the delay time "T" is derived based on the movement starting time "T" where the text display distance "L" is taken into consideration, and after the delay time "T" has passed, the voice message is outputted after the display of the text message. It is therefore possible to maintain the robustness of the interface that is adapted to each text display distance L.

(Fifth Variation)

The following describes the fifth variation related to the method of deriving the movement starting time "Ta" according to the present embodiment.

Generally speaking, the more obvious the contrast between the user's focal point and the color of the displayed characters, the earlier the user recognizes the text, so that the movement starting time Ta gets shorter.

The delay unit 105 according to the present variation derives the movement starting time "Ta" based on the contrast between the focal point and the characters using the following Equation 24.

$$Ta = t0 - \alpha7 \quad \text{(Equation 24)}$$

"t0" represents a predetermined time to be required for reducing the contrast as much as possible. Namely, the movement starting time "Ta" is derived by subtracting, from the time "t0", the time "α7" that changes according to the contrast.

The delay unit 105 derives the time "α7" based on the following Equation 25.

$$\alpha7 = t8 * f6(Q) \quad \text{(Equation 25)}$$

"Q" denotes the contrast while "t8" denotes a maximum time that can be reduced according to the contrast "Q".

The function "f6(Q)" is expressed by the following Equation 26.

$$f6(Q) = 1/(1+\exp(-((Q-QA)/(QC-QA)-0.5/0.1)) \quad \text{(Equation 26)}$$

"QA" represents a reference contrast while "QC" represents a maximum contrast, both for determining the movement starting time "Ta".

Thus, in the present variation, the delay time that is based on the movement starting time "Ta" where the contrast is taken into consideration is derived, and after the delay time "T" has passed, the voice message is outputted after the display of the text message, so that it is possible to maintain the robustness of the interface that is adapted to each contrast.

(Sixth Variation)

The following describes the sixth variation related to the method of deriving the movement starting time "Ta" according to the present embodiment.

By displaying the characters in red or flashing the characters, the user usually recognizes the characters earlier, so that the movement starting time "Ta" gets shorter.

The delay unit 105 according to the present variation derives the movement starting time "Ta" based on the degree of emphasis on the display mode of characters, using the following Equation 27.

$$Ta = t0 - \alpha 8 \quad \text{(Equation 27)}$$

"t0" denotes a predetermined time required for reducing the degree of emphasis for the display mode. That is to say that the movement starting time "Ta" is derived by subtracting, from the time "t0", the time "α8" that changes according to the degree of emphasis.

The delay unit 105 derives the time "α8" based on the following Equation 28.

$$\alpha 8 = t9 * f7(R) \quad \text{(Equation 28)}$$

"R" denotes the degree of emphasis on characters while "t9" denotes a maximum time that can be reduced according to the degree of emphasis "R".

The function "f7(R)" is expressed by the following Equation 29.

$$f7(R) = 1/1 + \exp(-((R-RA)/(RC-RA) - 0.5)/0.1)) \quad \text{(Equation 29)}$$

"RA" presents a reference degree of emphasis while "RC" presents a maximum degree of emphasis, both for determining the movement starting time "Ta".

Thus, in the present variation, the delay time "T" that is based on the movement starting time "Ta" where the degree of emphasis on characters is taken into account is derived, and after the delay time "T" has passed, the voice message is outputted after the display of the text message, so that it is possible to maintain the robustness of the interface that is adapted to each degree of emphasis on characters.

As described above, the present invention is explained with reference to the embodiment and the variations; however, the present invention is not limited to them.

For example, in the embodiment and the variations above, all of the movement starting time "Ta", the moving time "Tb" and the focusing time "Tc" are taken into consideration for deriving a delay time "T", however, the delay time "T" may be derived by considering at least one of them.

The delay time is derived based on user's personal information in the first variation whereas it is derived based on user's habituation in the second variation, however, it may be derived based on both of them.

In the embodiment and the variations, the voice output apparatus is explained as an apparatus for selling tickets by outputting a voice message and displaying the text message, however, an apparatus that performs different operations may be used instead, as long as it outputs a voice message and display the text message. The voice output apparatus may be used, for example, as a TV, a terminal in the car navigation system, a cell phone, a portable terminal, a personal computer, a telephone, a facsimile, a micro wave, a refrigerator, a cleaner, an electronic dictionary, and an electronic translator.

The voice output apparatus according to the present invention can improve the robustness of the interface between a user and the apparatus by surely transmitting information via text message and voice message, and is suitable for the use as an audio response apparatus that sells tickets by responding, by use of text message and voice message, to the user's verbal input.

The invention claimed is:

1. A voice output apparatus comprising:
a text display unit that displays a text message which is information to be transmitted to a user;
a delay determination unit that determines a delay time according to a form of the text message displayed by said text display unit, the delay time being a time necessary for an action taken by the user to visually identify a text message after the text message is displayed by said text display unit;
a voice output unit that outputs, via a voice message, the information to be transmitted, such that the output voice message represents the entire text message displayed by said text display unit, the voice message being output only when the delay time determined by said delay determination unit has passed after the text message is displayed by said text display unit; and
a size obtainment unit that obtains a size of characters included in the displayed text message,
wherein said delay determination unit estimates the delay time based on a previously determined relationship between the obtained size of the characters and the delay time, such that:
the estimated delay time decreases as the obtained size of the characters increases; and
the estimated delay time increases as the obtained size of the characters decreases.

2. A voice output apparatus comprising:
a text display unit that displays a text message which is information to be transmitted to a user;
a delay determination unit that determines a delay time according to a form of the text message displayed by said text display unit, the delay time being a time necessary for an action taken by the user to visually identify a text message after the text message is displayed by said text display unit;
a voice output unit that outputs, via a voice message, the information to be transmitted, such that the output voice message represents the entire text message displayed by said text display unit, the voice message being output only when the delay time determined by said delay determination unit has passed after the text message is displayed by said text display unit; and
a distance obtainment unit that obtains a distance between a set focal point and the displayed text message, the set focal point being located on said text display unit and for attracting the user's attention,
wherein said delay determination unit estimates the delay time based on a previously determined relationship between the obtained distance and the delay time, such that:
the estimated delay time increases as the obtained distance increases; and
the estimated delay time decreases as the obtained distance decreases.

3. The voice output apparatus according to claim 2, wherein said text display unit displays an agent as the focal point.

4. A voice output apparatus comprising:
a text display unit that displays a text message which is information to be transmitted to a user;
a delay determination unit that determines a delay time according to a form of the text message displayed by said text display unit, the delay time being a time necessary for an action taken by the user to visually identify a text message after the text message is displayed by said text display unit;

a voice output unit that outputs, via a voice message, the information to be transmitted, such that the output voice message represents the entire text message displayed by said text display unit, the voice message being output only when the delay time determined by said delay determination unit has passed after the text message is displayed by said text display unit; and a contrast obtainment unit that obtains a contrast between a color at a position on said text display unit and a color of characters included in the displayed text message, wherein said delay time determination unit estimates the delay time based on a previously determined relationship between the obtained contrast and the delay time, such that:

the estimated delay time decreases as the obtained contrast increases, such that the user's attention is drawn to the position on said text display unit as a result of the contrast; and the estimated delay time increases as the obtained contrast decreases.

5. A voice output apparatus comprising:

a text display unit that displays a text message which is information to be transmitted to a user;

a delay determination unit that determines a delay time according to a form of the text message displayed by said text display unit, the delay time being a time necessary for an action taken by the user to visually identify a text message after the text message is displayed by said text display unit;

a voice output unit that outputs, via a voice message, the information to be transmitted, such that the output voice message represents the entire text message displayed by said text display unit, the voice message being output only when the delay time determined by said delay determination unit has passed after the text message is displayed by said text display unit; and a flashing degree obtainment unit that obtains a degree of flashing of characters included in the displayed text message, wherein said delay determination unit estimates the delay time based on a previously determined relationship between the obtained degree of flashing and the delay time, such that:

the estimated delay time decreases as the obtained degree of flashing increases; and the estimated delay time increases as the obtained degree of flashing decreases.

6. A voice output apparatus comprising:

a text display unit that displays a text message which is information to be transmitted to a user;

a delay determination unit that determines a delay time according to a form of the text message displayed by said text display unit, the delay time being a time necessary for an action taken by the user to visually identify a text message after the text message is displayed by said text display unit;

a voice output unit that outputs, via a voice message, the information to be transmitted, such that the output voice message represents the entire text message displayed by said text display unit, the voice message being output only when the delay time determined by said delay determination unit has passed after the text message is displayed by said text display unit; and a personal information obtainment that obtains an age of the user, wherein said delay determination unit estimates the delay time based on a previously determined relationship between the obtained age of the user and the delay time, such that:

the estimated delay time increases as the obtained age increases; and the estimated delay time decreases as the obtained age decreases.

7. A voice output apparatus comprising:

a text display unit that displays a text message which is information to be transmitted to a user;

a delay determination unit that determines a delay time according to a form of the text message displayed by said text display unit, the delay time being a time necessary for an action taken by the user to visually identify a text message after the text message is displayed by said text display unit;

a voice output unit that outputs, via a voice message, the information to be transmitted, such that the output voice message represents the entire text message displayed by said text display unit, the voice message being output only when the delay time determined by said delay determination unit has passed after the text message is displayed by said text display unit; and a habituation specifying unit that obtains a number of times the user operates said voice output apparatus, wherein said delay determination unit estimates the delay time based on a previously determined relationship between the obtained number of times of operation and the delay time, such that:

the estimated delay time decreases as the obtained number of times of operation increases; and the estimated delay time increases as the obtained number of times of operation decreases.

8. A voice output apparatus comprising:

a text display unit that displays a text message which is information to be transmitted to a user;

a delay determination unit that determines a delay time according to a form of the text message displayed by said text display unit, the delay time being a time necessary for an action taken by the user to visually identify a text message after the text message is displayed by said text display unit;

a voice output unit that outputs, via a voice message, the information to be transmitted, such that the output voice message represents the entire text message displayed by said text display unit, the voice message being output only when the delay time determined by said delay determination unit has passed after the text message is displayed by said text display unit; and a habituation specifying unit that obtains an operation time during which the user operates said voice output apparatus, wherein said delay determination unit estimates the delay time based on a previously determined relationship between the obtained operation time and the delay time, such that:

the estimated delay time decreases as the obtained operation time increases; and the estimated delay time increases as the obtained operation time decreases.

9. A voice output method used by an information processing apparatus to output a voice message, said voice output method comprising:

displaying, on a text display unit, a text message which is information to be transmitted to a user;

determining a delay time according to a form of the text message displayed in said displaying, the delay time being a time necessary for an action taken by the user to visually identify a text message after the text message is displayed in said displaying;

outputting, via a voice message, the information to be transmitted, such that the output voice message represents the entire text message displayed by the text display unit, the voice message being output only when the delay time determined in said determining has passed after the text message is displayed in said displaying; and obtaining a size of characters included in the displayed text message, wherein said determining includes estimating the delay time based on a previously determined relationship between the obtained size of the characters and the delay time, such that:

the estimated delay time decreases as the obtained size of the characters increases; and the estimated delay time increases as the obtained size of the characters decreases.

10. A voice output method used by an information processing apparatus to output a voice message, said voice output method comprising:

displaying, on a text display unit, a text message which is information to be transmitted to a user;

determining a delay time according to a form of the text message displayed in said displaying, the delay time being a time necessary for an action taken by the user to visually identify a text message after the text message is displayed in said displaying;

outputting, via a voice message, the information to be transmitted, such that the output voice message represents the entire text message displayed by the text display unit, the voice message being output only when the delay time determined in said determining has passed after the text message is displayed in said displaying; and obtaining a distance between a set focal point and the displayed text message, the set focal point being located on the text display unit and for attracting the user's attention, wherein said determining includes estimating the delay time based on a previously determined relationship between the obtained distance and the delay time, such that:

the estimated delay time increases as the obtained distance increases; and the estimated delay time decreases as the obtained distance decreases.

11. The voice output method according to claim 10, wherein said displaying includes displaying an agent as the focal point.

12. A voice output method used by an information processing apparatus to output a voice message, said voice output method comprising:

displaying, on a text display unit, a text message which is information to be transmitted to a user;

determining a delay time according to a form of the text message displayed in said displaying, the delay time being a time necessary for an action taken by the user to visually identify a text message after the text message is displayed in said displaying;

outputting, via a voice message, the information to be transmitted, such that the output voice message represents the entire text message displayed by the text display unit, the voice message being output only when the delay time determined in said determining has passed after the text message is displayed in said displaying; and obtaining a contrast between a color at a position on the text display unit and a color of characters included in the displayed text message, wherein said determining includes estimating the delay time based on a previously determined relationship between the obtained contrast and the delay time, such that:

the estimated delay time decreases as the obtained contrast increases, such that the user's attention is drawn to the position on the text display unit as a result of the contrast; and the estimated delay time increases as the obtained contrast decreases.

13. A voice output method according used by an information processing apparatus to output a voice message, said voice output method comprising:

displaying, on a text display unit, a text message which is information to be transmitted to a user;

determining a delay time according to a form of the text message displayed in said displaying, the delay time being a time necessary for an action taken by the user to visually identify a text message after the text message is displayed in said displaying;

outputting, via a voice message, the information to be transmitted, such that the output voice message represents the entire text message displayed by the text display unit, the voice message being output only when the delay time determined in said determining has passed after the text message is displayed in said displaying; and obtaining a degree of flashing of characters included in the displayed text message, wherein said determining includes estimating the delay time based on a previously determined relationship between the obtained degree of flashing and the delay time, such that:

the estimated delay time decreases as the obtained degree of flashing increases; and the estimated delay time increases as the obtained degree of flashing decreases.

14. A voice output method used by an information processing apparatus to output a voice message, said voice output method comprising:

displaying, on a text display unit, a text message which is information to be transmitted to a user;

determining a delay time according to a form of the text message displayed in said displaying, the delay time being a time necessary for an action taken by the user to visually identify a text message after the text message is displayed in said displaying;

outputting, via a voice message, the information to be transmitted, such that the output voice message represents the entire text message displayed by the text display unit, the voice message being output only when the delay time determined in said determining has passed after the text message is displayed in said displaying; and obtaining an age of the user, wherein said determining includes estimating the delay time based on a previously determined relationship between the obtained age of the user and the delay time, such that:

the estimated delay time increases as the obtained age increases; and the estimated delay time decreases as the obtained age decreases.

15. A voice output method used by an information processing apparatus to output a voice message, said voice output method comprising:

displaying, on a text display unit, a text message which is information to be transmitted to a user;

determining a delay time according to a form of the text message displayed in said displaying, the delay time being a time necessary for an action taken by the user to visually identify a text message after the text message is displayed in said displaying;

outputting, via a voice message, the information to be transmitted, such that the output voice message represents the entire text message displayed by the text display unit, the voice message being output only when the delay time determined in said determining has passed after the text message is displayed in said displaying; and obtaining a number of times the user operates the information processing apparatus, wherein said determining includes estimating the delay time based on a previously determined relationship between the obtained number of times of operation and the delay time, such that:

the estimated delay time decreases as the obtained number of times of operation increases; and the estimated delay time increases as the obtained number of times of operation decreases.

16. A voice output method used by an information processing apparatus to output a voice message, said voice output method comprising:

displaying, on a text display unit, a text message which is information to be transmitted to a user;

determining a delay time according to a form of the text message displayed in said displaying, the delay time being a time necessary for an action taken by the user to visually identify a text message after the text message is displayed in said displaying;

outputting, via a voice message, the information to be transmitted, such that the output voice message represents the entire text message displayed by the text display unit, the voice message being output only when the delay time determined in said determining has passed after the text message is displayed in said displaying; and obtaining an operation time during which the user operates the information processing apparatus, wherein said determining includes estimating the delay time based on a previously determined relationship between the obtained operation time and the delay time, such that:

the estimated delay time decreases as the obtained operation time increases; and the estimated delay time increases as the obtained operation time decreases.

* * * * *